UNITED STATES PATENT OFFICE.

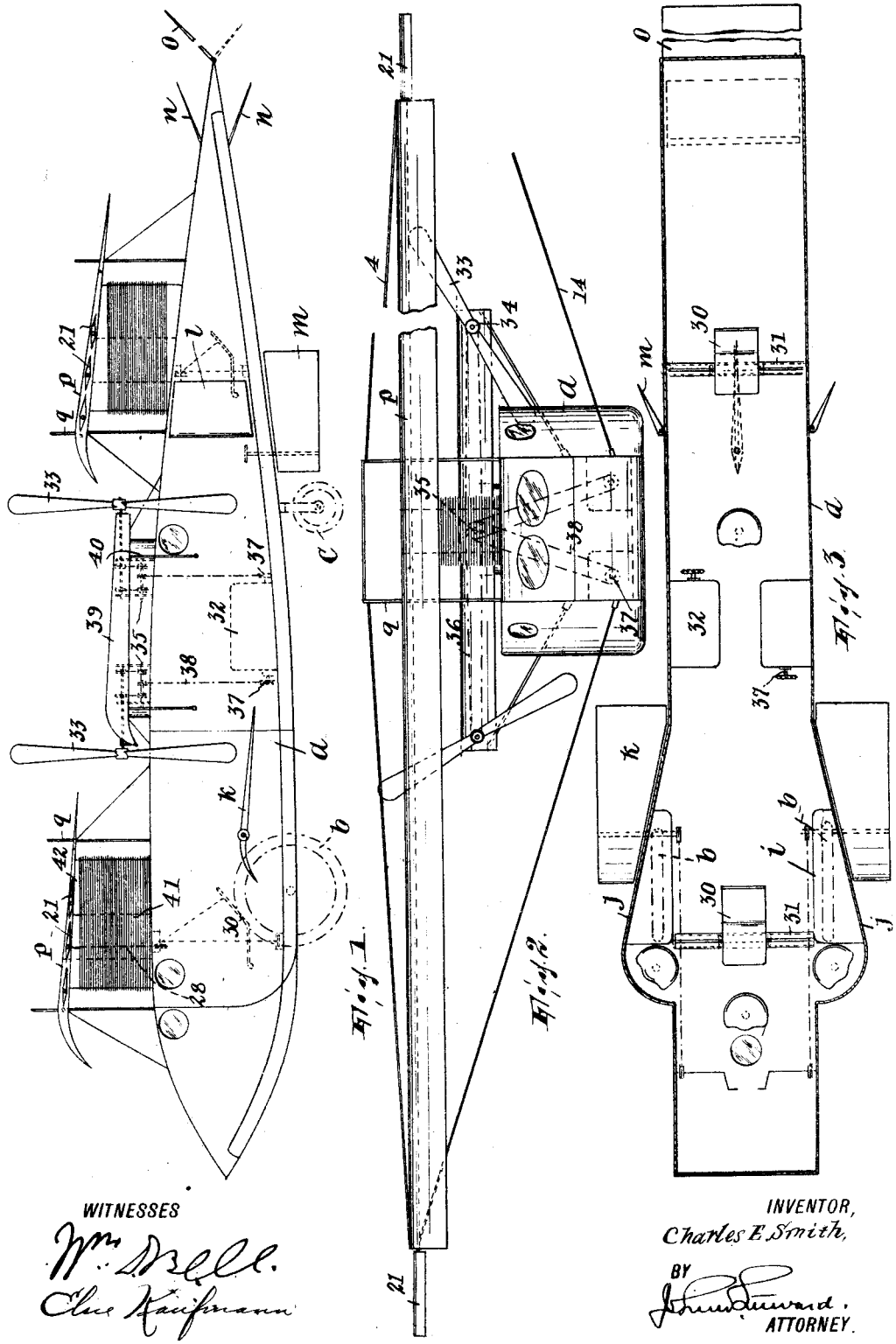

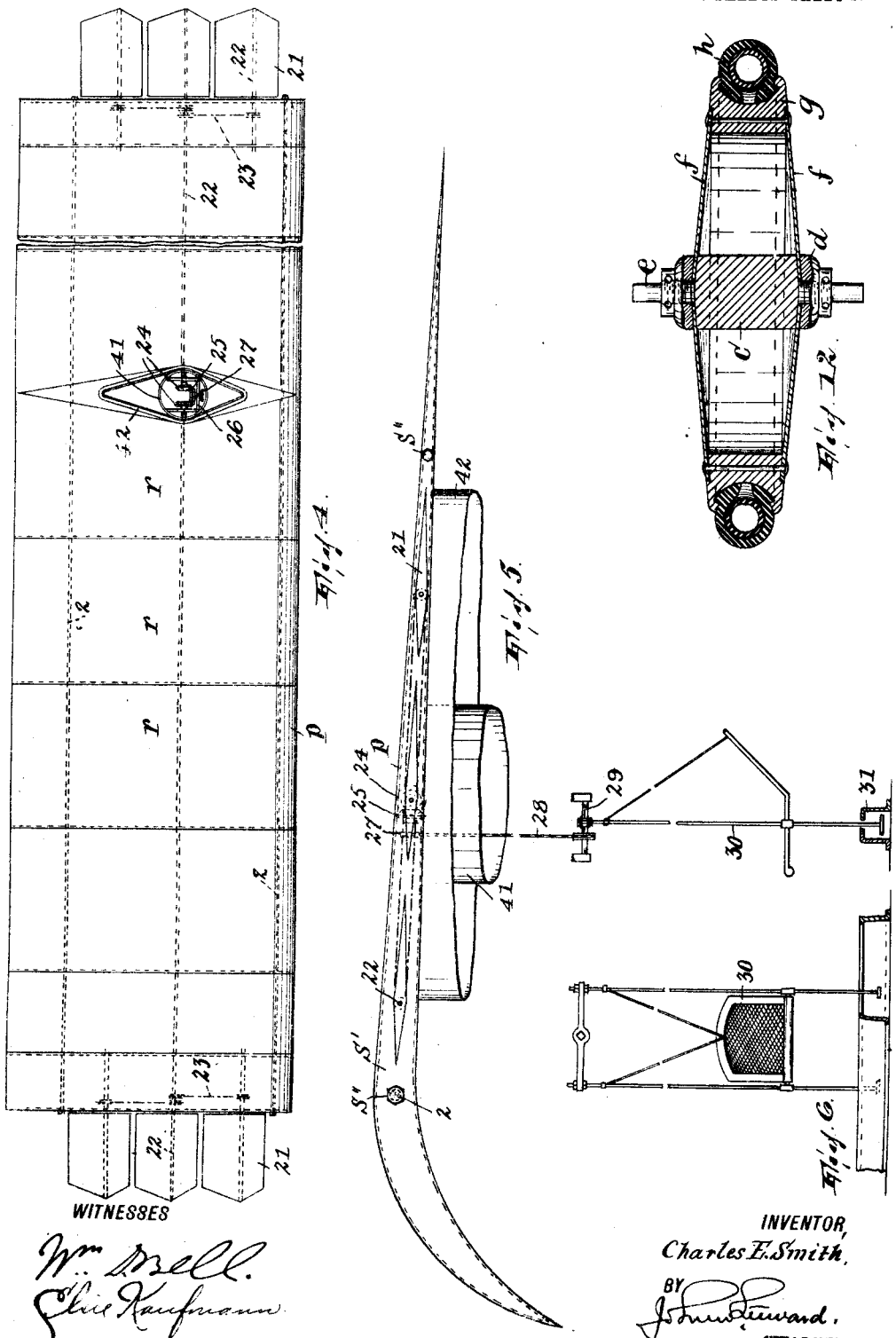

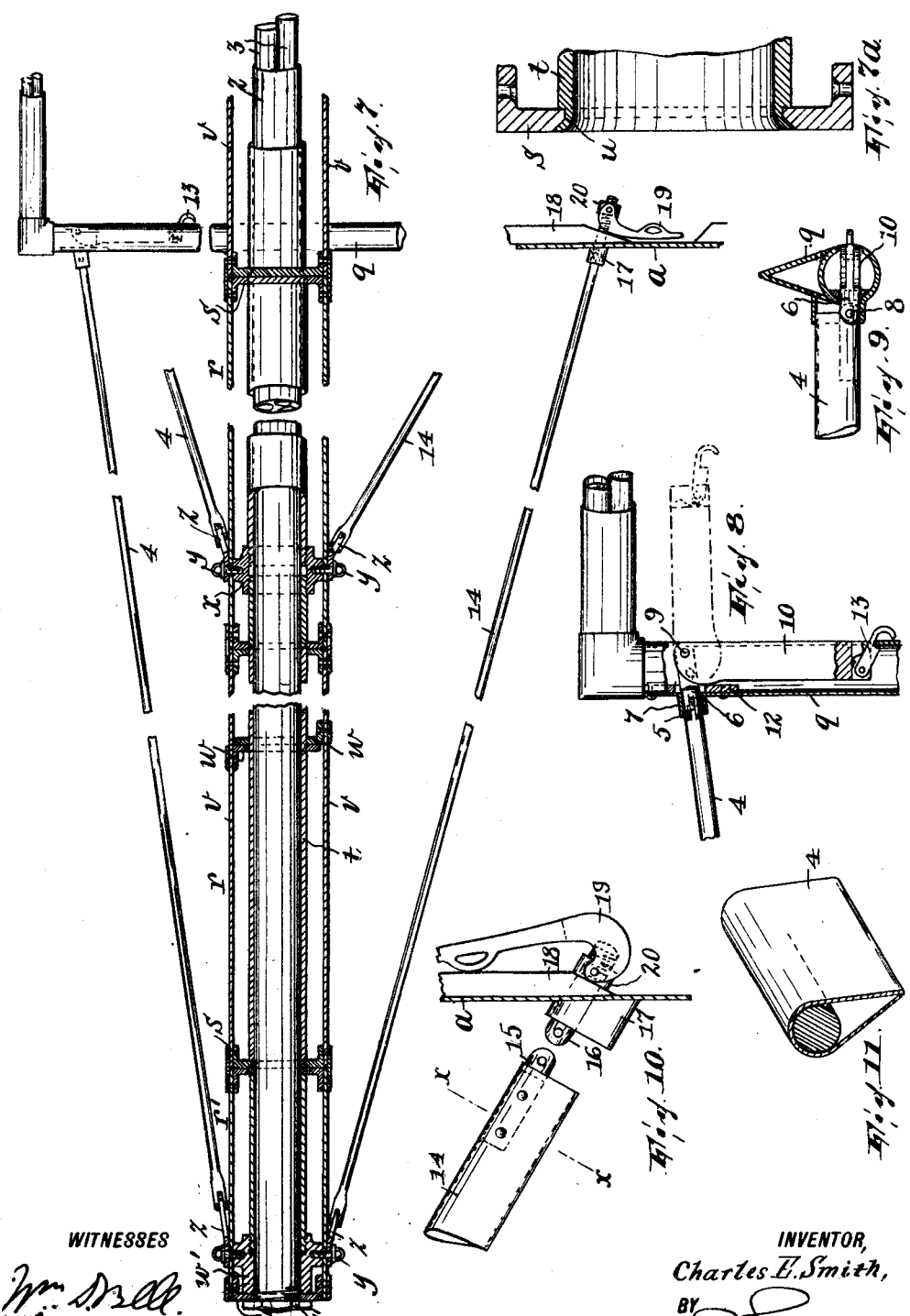

CHARLES E. SMITH, OF PATERSON, NEW JERSEY.

FLYING-MACHINE.

1,062,572.   Specification of Letters Patent.   Patented May 20, 1913.

Application filed April 27, 1912. Serial No. 693,625.

*To all whom it may concern:*

Be it known that I, CHARLES E. SMITH, a citizen of the United States, residing at Paterson, in the county of Passaic and State of New Jersey, have invented certain new and useful Improvements in Flying-Machines, of which the following is a specification.

This invention relates to flying machines and it consists in certain improvements in flying machines of the kind set forth in my previous applications for U. S. Letters Patent filed June 17th, 1910, and April 29th, 1911.

The invention will be found fully illustrated in the accompanying drawings, wherein, Figure 1 is a side elevation of the improved machine; Fig. 2 a front elevation thereof; Fig. 3 a horizontal sectional view; Fig. 4 a plan view of one of the main planes; Fig. 5 a side elevation of the said planes and of the means for operating minor pivotally movable planes forming lateral extensions of the main plane; Fig. 6 shows a part of the aforesaid means in front elevation; Fig. 7 is a view partly in front elevation and partly in section of one of the main planes; Figs. 7ª, 8, 9, 10 and 11 are detail views of the framework, Fig. 9 being a transverse sectional view of Fig. 8, and Fig. 11 a sectional view on the line $x$—$x$ of Fig. 10; and, Fig. 12 is a sectional view of one of the wheels on which the machine may run when traveling over the ground.

$a$ is an elongated hollow body forming a carrier for the aviator, being in side elevation rather bluntly tapering at its forward end (left hand end in Fig. 1) and sharply tapering at its rear end.

When the machine rests on a surface, water or land, it is designed to be supported by the wheels $b$ and $c$, the detail construction of one of which is shown in Fig. 12 where $c$ is a hub against the opposite ends of which are secured, by the nuts $d$ screwed onto threaded portions of the trunnions $e$ for the wheel, the concavo-convex disks $f$ having their concave sides facing inwardly and where $g$ is a peripherally grooved felly to which the opposite sides of said disks are secured in such manner as to give the whole an air-tight chamber construction; $h$ is a resilient tire fitted into the groove of the felly. All the wheels $b$ and $c$ preferably have the same construction, the wheel $c$ being however smaller than the two forward wheels $b$ and being preferably pivoted on a vertical axis, as shown.

The wheels $b$ are housed in recesses $i$ formed in the lateral projections $j$ at the front part of the body $a$, said portions $j$ being rounded at the front and having their rear walls converging gradually toward the planes of the sides of the body, which sides are generally parallel from end to end of said body.

$k$, $l$, $m$, $n$ and $o$ are various blades suitably arranged to swing on pivots and provided with suitable operating means, not shown, whereby to change the course of the machine or control the same according to different conditions of wind pressure and the like.

There are preferably two main supporting planes $p$ provided, being disposed above the body, one in advance of the other. The construction of each of these planes and the manner in which they are attached to the body will now be described, reference being had to only one:

In Figs. 7 to 11, $q$ designates one of two arched frames, each of which consists of outer sections of pipe coupled together in the form of an arch and reinforced by inner sections of smaller pipes, as shown and as fully explained in my application aforesaid filed April 29th, 1911. The two frames $q$ are suitably secured upon the body $a$ as shown in Figs. 1 and 2.

Each plane is made up of a series of sections arranged one after the other crosswise of the machine. Each section is hollow, and since the several sections are alined with each other the whole plane is hollow, though of flattened form, tapering at the forward and rear ends. The forward end of each plane as shown in Fig. 5 is curved downwardly, the rest of the plane being substantially straight, though inclined slightly rearwardly.

Each of the main plane sections $r$ comprises two longitudinal channel bars $s$, two sections of pipe $t$ having their ends reduced and fitted into holes $u$ in the channel bars, said ends being then upset as shown in Fig. 7ª so that the two pipes and channel bars constitute a rigid structure, and upper and lower sheets $v$ of stiff material, such as aluminum, the same being riveted at its edges to the top and bottom surfaces of the channel bars. The hollow plane section $r$ thus formed may be reinforced against collapsing by the angle irons w which are penetrated by the pipes t and bear respectively against said sheets v, being riveted thereto. Within one or more of the plane sections at each side of the middle of the plane is arranged a collar x which is penetrated by the pipe t (the pipe in this case being preferably made in two parts, as shown in Fig. 7 and the ends of the parts being screwed into the collar) and against which the sheets v bear, as shown, screws y being passed through said sheets and driven into the collar and holding in place the eyes z. The plane section r' at the extremity of each plane is substantially similar to each plane section r excepting that its outer channel bar s' is not apertured for the pipe t, which is simply screwed into the collar w' against which said channel bar s' abuts.

The several plane sections are arranged in the same geometric plane side by side and, when so disposed, with all their pipes t alined with each other, a stiffening structure, such as is described in my application filed April 29th, 1911, consisting of an outer tube 2 and a plurality of smaller tubes 3 snugly fitted into the tube 2, is passed through the pipes t, its extremities penetrating the channel bars s' and having nuts s'' for preventing relative lateral movement as between said stiffening structure and the planes.

In view of the foregoing it will be observed that on account of the composite construction of each plane, the same is not only readily assembled but is capable of being altered to change its area by either adding or removing sections. The construction of each plane is further exceedingly light and strong.

To each upper eye z is attached a stay-rod 4 which has a wedge-shaped tubular cross-section as shown in Fig. 11. At the free end of this stay-rod is formed a joint member 5 adapted to be received by a forked joint member 6 arranged to slide in a tubular boss 7 projecting from the adjoining frame g. The joint member 6 slides lengthwise in the boss 7 so that when the pin 8 which connects the parts 5 and 6 is exposed it may be removed to break the joint, being however held in working position when engaged by the boss 7. Housed in the upright portion of the frame g and pivoted therein on the pin 9 is a cam lever 10 whose cam 11 in the normal or housed position of the cam lever bears against a plate 12 on the inside of said upright portion of the frame and holds the parts 5 and 6 in the position shown in Fig. 8. Said upright portion of the frame is slotted to allow the cam lever to be swung into the dotted line position so that the pin 8 will clear the boss 7, and to hold the cam lever normally against such movement I provide a dog 13 pivoted in the cam lever and adapted to engage the lower end of the slot.

To each lower eye z is attached a stay rod 14 similar to stay rod 4 and having a joint member 15 to be pinned to the joint member 16 in the same manner as the joint members 6 and 7 are pinned together. Each joint member 16 slides in a boss 17 in a wall of the body a. Against a shoulder 18 on the inside of said wall of the body is adapted to bear a cam lever 19 which is pivoted on a nut 20 screwed onto the threaded inner end of the joint member 16.

Thus, having connected up the several upper stay-rods and assembled the lower stay-rods with the body and plane, by swinging the cam levers 19 into the position shown in Fig. 7, the upper and lower stay rods can be put under strain sufficient to impart the needed stability to the entire structure. The degree of strain may be varied by turning the nuts 20 on the joint member 16.

It should be remarked that the upright frames g have the wedge-shaped cross-section (see Fig. 9) already described in reference to the stay rods and for the same reason, so as to reduce the resistance of the air, the sharp side of the parts in each instance being faced rearwardly.

At the extremity of each plane are arranged two or more minor planes 21 each pivoted on a transverse shaft 22 arranged to rock in the framework of the plane, the several shafts 22 being connected, so as to rock together, by sprocket and chain connections 23. One of the shafts 22 of each of the two sets of these planes 21 may extend inwardly, such two shafts being provided with bevel gears 24 meshing with a common bevel gear 25 journaled in a suitable frame 26 in the framework of the plane. Over a sprocket wheel 27 rotating with the pinion 26 extends an endless chain 28. This chain extends around a rotary shaft 29 journaled in the body a and having suspended from it a seat structure 30 whose lower portion is guided in the transverse horizontal ways 31. Thus, as one side or the other of the machine in flying falls lower than the other the incidental swinging of the seat will cause reverse movements of the two sets of planes 21, with the effect of counteracting the described departure from a state of equilibrium.

The motors are shown at 32 and the propellers at 33, there being two on each side, one forward of the other; the propeller shafts 34 are driven from intermediate shafts 35 through the medium of sprocket and chain connections 36, said shafts 35 being likewise connected with the driving shafts 37 of the motors by the sprocket and chain connections 38. The body a and a plane structure 39 suitably supported by the framework 40 upon the carrier a together inclose the means for transmitting power from the motors to the propellers.

The chains 28 are preferably housed in upright funnels 41 affording exits for the aviator upwardly from the carrier. These funnels are inclosed in casings 42 which taper to the front and rear, so as to reduce the resistance of the air, and around these casings the radiators 43 for the motors 32 (when the same are of a type requiring radiating means) may be coiled.

Having thus fully described my invention, what I claim as new and desire to secure by Letters Patent is:—

1. In a plane for a flying machine, a series of unitary plane-sections arranged in the same geometric plane, each plane-section having an individual frame and individual upper and lower sheet-like members attached respectively to the upper and lower sides of said frame, and means, extending between the upper and lower sheet-like members of said plane-sections, for securing said plane-sections rigidly together, substantially as described.

2. In a plane for a flying machine, a series of unitary plane-sections arranged in the same geometric plane, each plane-section having an individual frame and two transverse tubular members forming parts of said frame and an individual sheet-like member attached to said frame, the tubular members of the several plane-sections being alined with each, and means, penetrating the several tubular members of said plane-sections, for securing said plane-sections rigidly together, substantially as described.

3. In a plane for a flying machine, a series of unitary plane-sections arranged in the same geometric plane, each plane-section having an individual frame and two transverse tubular members forming parts of said frame and an individual sheet-like member attached to said frame, the tubular members of the several plane-sections being alined with each, and means, including an elongated stiffening structure penetrating the several tubular members of said plane-sections, for securing said plane-sections rigidly together, substantially as described.

4. In combination, a horizontal plane, a structure to be carried thereby having bosses 7 projecting therefrom, and means for sustaining said structure from the plane including upper and lower sets of stay-rods, joint-members respectively alined with the stay-rods of one set and received by said bosses, a transverse pin penetrating each of the latter stay-rods and corresponding joint member, said pin being movable from a position exterior of, to a position within, the corresponding boss upon longitudinal movement of the stay-rod toward the boss, and means, engaging said structure and attached to the joint member, for drawing said stay-rod relatively toward the boss, substantially as described.

5. In combination, with the hollow carrier, means attached to the carrier for supporting the same comprising a hollow substantially horizontal plane comprising upper and lower sheet-like members converging together at the front and rear and arranged above the carrier, a motor arranged in the carrier, propellers, rotary shafts carrying the propellers and journaled in said plane between the members thereof, and means for transmitting power from the motor to said shafts, said means being inclosed within the carrier and the plane, substantially as described.

6. In combination, with a hollow carrier, planiform supporting means therefor attached thereto, an upwardly projecting funnel extending from the carrier, and a casing tapering forwardly and rearwardly, inclosing the funnel, substantially as described.

7. In combination, with a hollow carrier, planiform supporting means therefor attached thereto, an upwardly projecting funnel extending from the carrier, a casing, tapering forwardly and rearwardly, inclosing the funnel, propelling means, a motor arranged in the carrier, and a radiator for the motor extending around the casing, substantially as described.

In testimony whereof I affix my signature in presence of two witnesses.

CHARLES E. SMITH.

Witnesses:
 JOHN W. STEWARD,
 WM. D. BELL.